United States Patent [19]

Schwitters et al.

[11] 4,201,558
[45] May 6, 1980

[54] METHOD AND APPARATUS FOR PREPARING AND DISPENSING A SEMI-FROZEN PRODUCT

[75] Inventors: Stephen W. Schwitters, Rockford; Preston L. Aylesworth, Rockton, both of Ill.

[73] Assignee: Beatrice Foods Co., Chicago, Ill.

[21] Appl. No.: 965,607

[22] Filed: Dec. 1, 1978

[51] Int. Cl.² ............................................. F25C 1/18
[52] U.S. Cl. ....................................... 62/70; 62/306; 62/342; 137/594; 137/566; 141/46; 222/146 C
[58] Field of Search ................... 62/342, 343, 306, 70; 137/594, 566, 567; 222/146 C, 129.4; 417/458; 141/46, 261

[56] References Cited

U.S. PATENT DOCUMENTS

| | | | |
|---|---|---|---|
| 2,896,421 | 7/1959 | Rader | 62/135 |
| 3,044,878 | 7/1962 | Knedlik | 99/28 |
| 3,108,449 | 10/1963 | Lents | 62/70 |
| 3,298,190 | 1/1967 | Harker | 62/136 |
| 3,359,748 | 12/1967 | Booth | 62/342 X |
| 3,460,713 | 8/1969 | Cornelius | 222/1 |
| 3,591,051 | 7/1971 | Mitchell et al. | 222/56 |
| 3,730,500 | 5/1973 | Richards | 222/146 C X |
| 3,851,797 | 12/1974 | Jacobs | 222/129.4 X |
| 3,881,636 | 5/1975 | D'Aubreby | 222/129.4 |
| 3,934,427 | 1/1976 | Keyes | 62/342 |

*Primary Examiner*—William E. Wayner
*Assistant Examiner*—William E. Tapolcai, Jr.
*Attorney, Agent, or Firm*—Morsbach & Pillote

[57] ABSTRACT

A method and apparatus for preparing and dispensing a semi-frozen food product containing liquid and gaseous ingredients including a refrigerated freezing chamber and volumetric type gas and liquid pumps operable when driven to pump gas and liquid in preselected proportions and under pressure to the freezing chamber. The gas and liquid pumps are motor driven under the control of a pressure responsive control which starts the pumps when the pressure in the freezing chamber falls below a predetermined super-atmospheric pressure range and stops the pumps when it rises above that predetermined super-atmospheric pressure range. The gas and liquid are supplied to the respective pumps under a pressure that is above atmospheric pressure but below the predetermined super-atmospheric pressure range to be maintained in the freezing chamber, and hold-back valves are provided between the pumps and the freezing chamber to inhibit flow of liquid and gaseous ingredients to the freezing chamber until the pressure at the outlets of the pumps exceeds the pressure at the inlets of the pumps.

25 Claims, 9 Drawing Figures

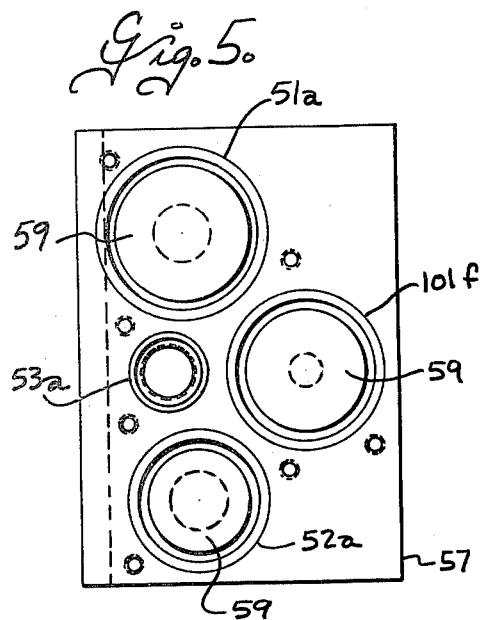
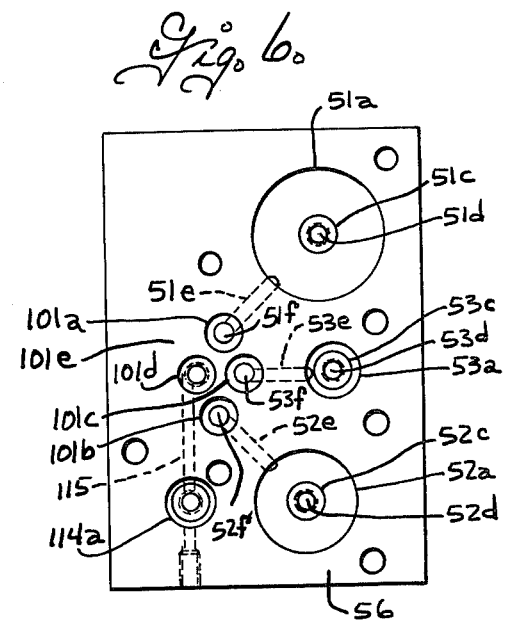
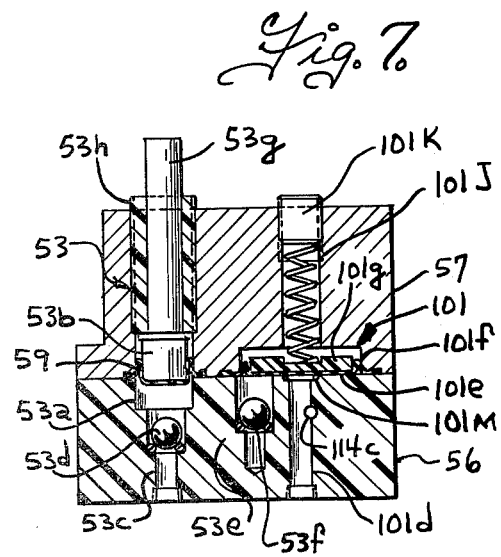
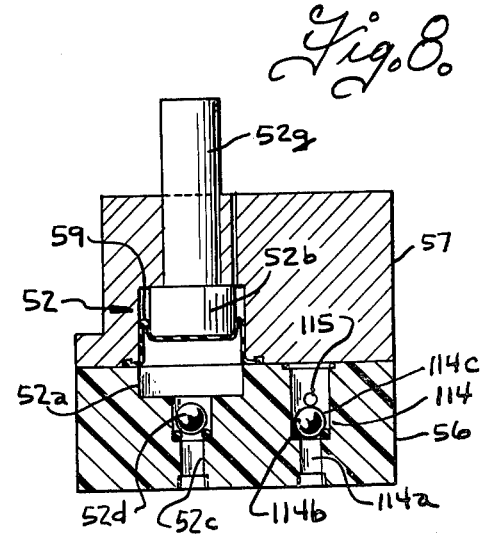
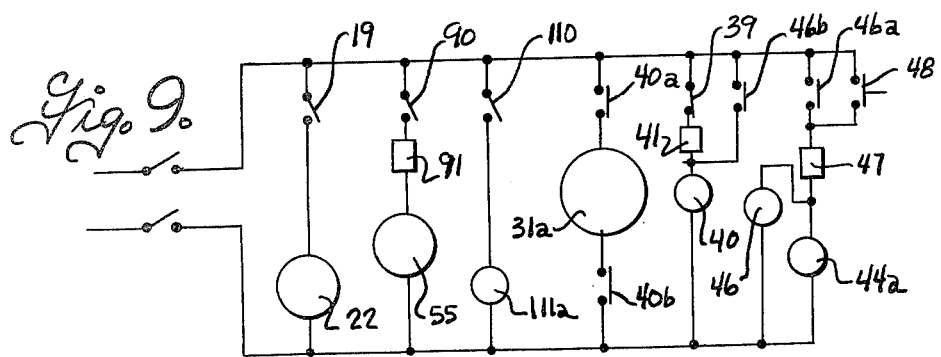

METHOD AND APPARATUS FOR PREPARING AND DISPENSING A SEMI-FROZEN PRODUCT

BACKGROUND OF THE INVENTION

It has been known to produce a semi-frozen food product by delivering liquid and gaseous ingredients to a freezing chamber that refrigerates and agitates the liquid and gaseous ingredients to form a semi-frozen product. Some prior apparatus operate the freezing chamber at atmospheric pressure. In order to achieve a higher percentage of gas in the final product, apparatus have also been made which operate the freezing chamber at above atmospheric pressure. However, some difficulties have been encountered in maintaining a uniform proportion of gas and liquid in the final product under the varying operating conditions encountered during start-up and operation of pressurized type freezing and dispensing apparatus.

In some prior apparatus for preparing and dispensing a semi-frozen food product containing liquid and gaseous ingredients such as disclosed in Knedlik U.S. Pat. No. 3,044,878, the liquid ingredient is pumped into the freezing chamber under the control of a liquid level sensor and the gas is supplied at a preselected superatmospheric pressure to the freezing chamber to maintain a gaseous head in the freezing chamber above the liquid. However, in such freezing apparatus, the amount of gas that mixes with the liquid in the freezing chamber is not accurately controlled but is dependent on several variables including pressure, temperature, time and amount of mixing, at least some of which will inherently vary during normal operation. Moreover, the gas in the freezing chamber expands during withdrawal of the product and tends to cause sputtering at the dispensing outlet.

Other apparatus, for example as shown in U.S. Pat. No. 3,460,713, pre-mix a gas such as carbon dioxide with the beverage producing liquid in a carbonator, and feed the pre-mixed liquid and gas under pressure into the freezing chamber. However, the amount of gas which is mixed with the liquid in the carbonator is also dependent on a number of variables including not only pressure but also temperature and time. While the pressure can be readily controlled, temperature control would require the use of additional refrigeration apparatus to cool the carbonator and maintain a constant temperature therein. The time variable cannot be readily controlled but is dependent on the average rate at which the product is withdrawn from the freezing cylinder. Moreover, the use of a carbonator and further refrigeration apparatus to control the temperature of the carbonator, markedly increases the cost of the apparatus.

More accurate control of the proportion of gas and liquid in the frozen product is achieved by the use of volumetric type liquid and gas pumps to feed the liquid and gas into the freezing chamber, as disclosed in U.S. Pat. No. 2,896,421 of Rader. The apparatus disclosed in that patent is arranged for operation only when the liquid and gaseous ingredients are supplied at substantially atmospheric pressure to the gas and liquid pumps. However, some gases, such as carbon dioxide gas used in making frozen slush-type beverages, are supplied in high pressure containers and it is difficult to accurately maintain the pressure on the gas supplied from such high pressured cylinders to the volumetric gas pump at substantially atmospheric pressure. Further, the volumes of gas that are utilized are frequently several times, for example from two to four or more times the volume of the liquid and, if the gas is supplied at atmospheric pressure to the gas pump, the gas pump would have to have a very large volumetric displacement as compared to that of the liquid pump.

It has also been proposed as disclosed in U.S. Pat. No. 3,591,051 to use a proportioning control in which a slide forms separate gas and liquid chambers in a housing and the slide is reciprocated to alternately expand and contract the volumes of the gas and liquid chambers in response to the pressures on the gaseous and liquid ingredients and under the control of solenoid valves operated in response to reciprocation of the slide. The pressures on the gas and liquid ingredients required to reciprocate the slide are substantially above the pressure to be maintained in the freezing chamber. High operating pressures aggravates the problem of providing and maintaining seals between the relatively moving parts. Further, the pressure of the water supply varies from time-to-time and in different localities and many water supplies cannot be relied upon to consistently provide water at pressures sufficiently above the pressure in the freezing chamber to enable operation of such a proportioning control.

SUMMARY OF THE INVENTION

An important object of this invention is to provide a method and apparatus for preparing and dispensing a semi-frozen food product containing liquid and gaseous ingredients in which the proportions of liquid and gaseous ingredients in the food product are accurately controlled over a wide range of operating conditions including start-up of the apparatus.

A more particular object of this invention is to provide a method and apparatus for preparing and dispensing a slush-type carbonated beverage containing water, flavoring syrup and carbon dioxide gas in which volumetric type pumps are provided for the water, flavoring syrup and gas to deliver the same in predetermined proportions to a pressurized freezing chamber, over a wide range of operating conditions.

Another object of this invention is to provide a method and apparatus for preparing and dispensing a semi-frozen food product containing liquid and gaseous ingredients in which the relative proportions of the several ingredients can be readily varied.

Still another object of this invention is to provide an apparatus for preparing and dispensing a semi-frozen food product containing liquid and gaseous ingredients which can be economically manufactured and does not require frequent attention or the services of skilled technicians in order to operate the same.

Accordingly, the present invention provides a method and apparatus for preparing and dispensing a semi-frozen food product containing liquid and gaseous ingredients which includes an enclosed freezing chamber adapted to contain the liquid and gaseous ingredients under superatmospheric pressure and having a dispensing outlet, means for stirring the ingredients in the chamber, and means for refrigerating the freezing chamber sufficient to freeze a quantity of the mixed ingredients therein, with volumetric gas and liquid pumps that are motor driven to deliver gas and liquid under pressure and in predetermined proportions to the freezing chamber, means for supplying at least the gaseous ingredient to the volumetric gas pump at a pressure above atmospheric pressure and below the pressure to be maintained in the freezing chamber, and hold-back valve means for inhibiting the flow of gas and liquid from the volumetric gas and liquid pumps to the freezing chamber until the pressure at the outlet of the gas and liquid pumps exceeds the inlet pressure, whereby the proportions of gas and liquid delivered to the freezing chamber are controlled by the volumetric gas and liquid pumps.

These, together with other objects, features and advantages of this invention will be more readily understood by reference to the following detailed description, when taken in connection with the accompanying drawings wherein:

FIG. 5 is a sectional view taken on the plane 5—5 of FIG. 3;

FIG. 6 is a sectional view taken on the plane 6—6 of FIG. 4;

FIG. 7 is a sectional view taken on the plane 7—7 of FIG. 4;

FIG. 8 is a sectional view taken on the plane 8—8 of FIG. 4; and

FIG. 9 is a schematic diagram of the electrical controls.

Figure 1:
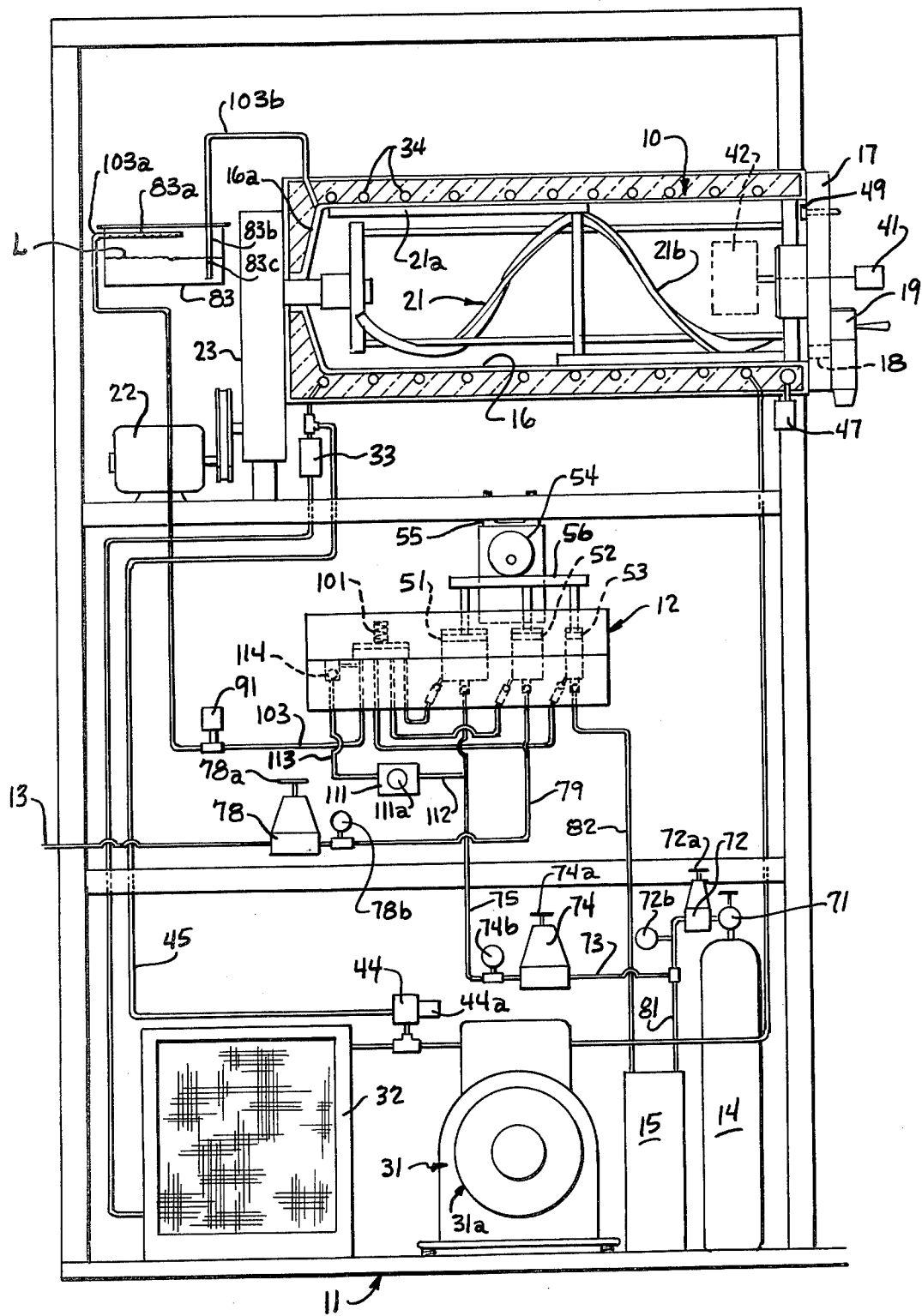
FIG. 1 is a diagrammatic view of an apparatus for preparing and dispensing a semi-frozen food product containing liquid and gaseous ingredients and embodying the present invention.
Figure 2:
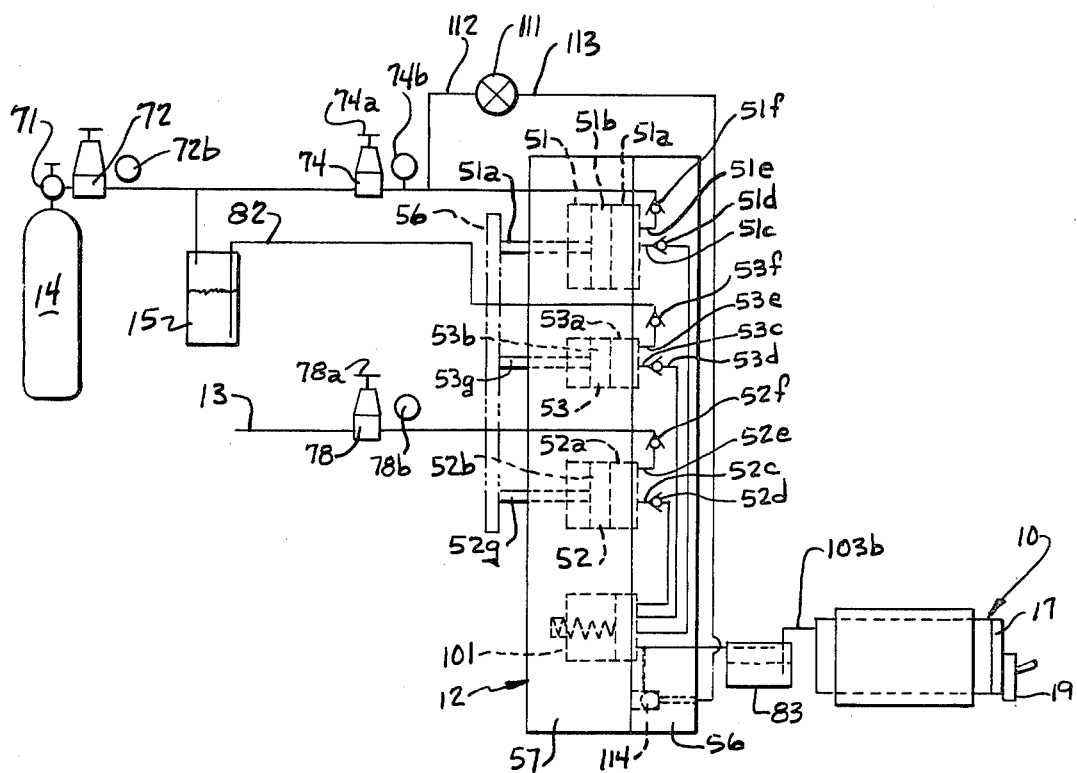
FIG. 2 is a schematic diagram of the apparatus.

The present invention is generally adapted for use in preparing and dispensing a semi-frozen food product containing liquid and gaseous ingredients when the gaseous ingredients are supplied under a super-atmospheric pressure for example in a pressurized shipping container. The apparatus is particularly useful in preparing a slush-type carbonated beverage containing water, flavoring syrup and carbon dioxide.

The apparatus in general includes a freezing chamber 10 adapted to receive a quantity of the liquid and gaseous ingredients under super-atmospheric pressure, a refrigerating mechanism 11 for refrigerating the freezing chamber sufficient to freeze a quantity of the mixed liquid and gaseous ingredients therein, and means including a volumetric-type pumping apparatus 12 for delivering water from a water supply 13, gas from a pressurized gas container 14 and flavoring syrup from a flavoring syrup reservoir 15 in predetermined proportions and under pressure to the freezing chamber 10. The pressurized freezing chamber 10 is of conventional construction and includes a cylinder 16 that is closed at one end 16a and it has a door 17 closing its other end and provided with a dispensing outet 18 controlled by a dispensing valve 19. A scraper and beater 21 is mounted for rotation in the freezing cylinder 16 and is driven as by a drive motor 22 through a speed reducer 23. As is conventional, the beater 21 includes scraper blades 21a for removing frozen product from the walls of the cylinder 16 and mixing or agitating blades 21b for agitating and mixing the product in the freezing cylinder. Blades 21b are advantageously in the form of a spiral or helix arranged to aid in advancing the semi-frozen product along the cylinder toward the dispensing outlet 18.

The refrigerating apparatus 11 includes a compressor 31 having a compressor drive motor 31a, a condenser 32, an expansion control valve 33 and evaporator 34. The evaporator 34 is disposed in a heat exchange relation with the cylinder 16 and the refrigerating mechanism is operated to refrigerate the freezing chamber sufficient to freeze a quantity of the mixed liquid and gaseous ingredients in the chamber. The refrigeration is preferably operated under the control of a mechanism 42 disposed in the freezing chamber and which senses the freezing condition of the product in the freezing chamber. The mechanism 42 is conveniently of the type shown in the U.S. Pat. to Harker No. 3,298,190, to which reference is made for more complete description, and the mechanism 42 is arranged to sense viscosity or stiffness of the semi-frozen products in the freezing chamber and to actuate a switch 41 to start and stop the refrigeration apparatus as required to maintain the product in the freezing chamber at a preselected viscosity or consistency. As schematically shown in FIG. 9, viscosity sensing switch 41 is connected in a circuit with a normally closed manually operable switch 39 and a motor control relay 40. The viscosity sensing switch 41 is normally closed and is operative to energize relay 40 and close motor control relay contacts 40a and 40b to energize the compressor motor 31a. The switch 41 is opened only when the consistency of the product increases above a preselected value to thereby stop the compressor drive motor 31a and the mechanism 42 is preferably adjustable as described in U.S. Pat. No. 3,298,190, to enable adjustment of the product viscosity maintained in the freezing. Manual switch 39 can also be opened to de-energize relay 40 and stop the compressor drive motor. Provision is also conveniently made for defrosting the freezing cylinder and, as shown in FIG. 1, a defrost valve 44 is connected to the outlet of the compressor 31 and is operative to by-pass hot gas from the compressor through a by-pass line 45 to the inlet of the evaporator 34. Valve 44 is conveniently operated by an electroresponsive operator 44a and, as schematically shown in FIG. 9, the valve operator 44a is connected in a circuit with a manually operable switch 48 and a defrost thermostat 47 arranged to sense the temperature of the freezing cylinder 16. A relay 46 is connected in parallel with defrost solenoid 44a to be energized when the defrost solenoid is energized and relay 46 is operative, when energized, to close relay contacts 46a connected in parallel with manual switch 48 to establish a holding circuit, and also close contacts 46b to energize the motor start relay 40. The thermostat 47 is arranged to close when the temperature in the freezing cylinder is below the freezing temperature of the mixed ingredients in the cylinder 16 and to open when the temperature rises above the freezing temperature. Thus, when switch 48 is closed, the compressor is driven and the defrost valve 44 is opened to thereby deliver hot gas to the evaporator and defrost the cylinder until the thermostat 47 opens. A gas bleed valve 49 is preferably provided in the freezing cylinder, conveniently in the door adjacent the top of the freezing cylinder, and is manually operable from its normal closed position to an open position to bleed air from the freezing cylinder during start-up. A pressure relief valve (not shown) may also be provided in the door and arranged to open at a preselected pressure above the pressure normally maintained in the freezing chamber to vent product from the freezing chamber and prevent build-up of excessive pressure in the freezing chamber.

Figure 3:
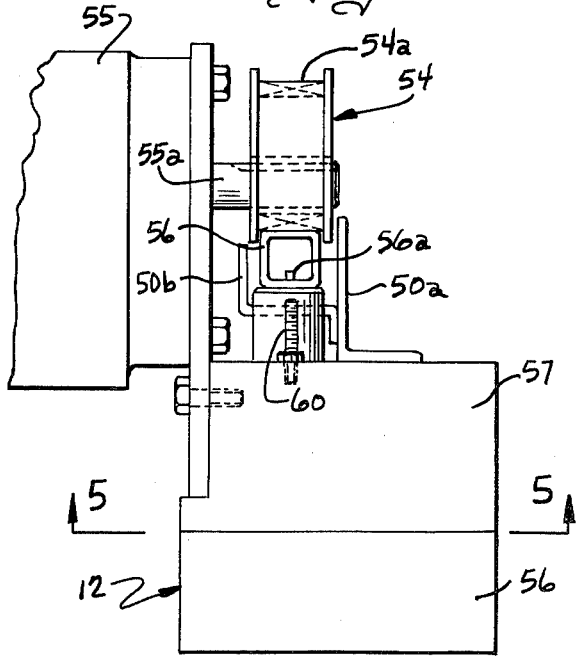
FIG. 3 is a fragmentary side elevational view of a volumetric pump apparatus for use in the present invention.
Figure 4:
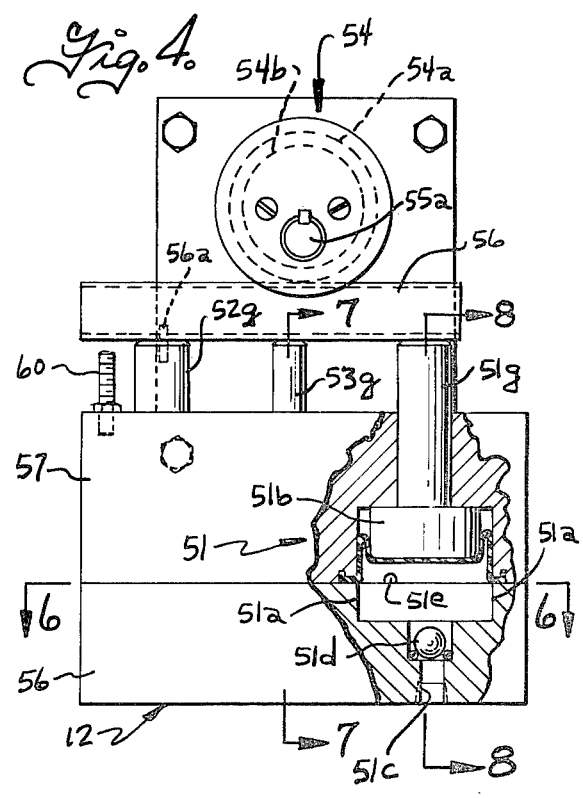
FIG. 4 is an end elevational view of the pump apparatus of FIG. 3.

Provision is made for feeding liquid and gaseous ingredients to the freezing cylinder under pressure to normally maintain the mixed gas and liquid ingredients in a preselected super-atmospheric pressure range, for example in the range of 20 to 30 p.s.i.g. However, when starting up the apparatus, the freezing cylinder is empty and the pressure in the freezing cylinder is at substantially atmospheric pressure. Further, if the rate of withdrawal from the freezing cylinder through the dispensing outlet and valve 19 exceeds the rate at which the product is supplied to the freezing cylinder, the pressure in the freezing cylinder can also drop below the desired range. The apparatus for delivering gaseous and liquid product to the freezing cylinder is arranged to deliver the several liquid and gaseous ingredients in preselected proportions over a wide range of operating conditions including start-up of the apparatus. The product ingredient feed apparatus includes a volumetric gas pump 51 for pumping gaseous ingredients at a preselected rate, and at least one and preferably two volumetric liquid pumps 52, 53 for respectively pumping water and flavoring syrup through the freezing cylinder. The several volumetric pumps 51-53 are driven in timed relation with each other as by a cam 54 driven by a motor 55 and which operates a pump actuator 56 to cyclically drive the pumps 51-53. The pumps 51-53 are each of the reciprocating type and respectively include pumping chambers 51a-53a and displacement members 51b-53b movable to vary the volume of the respective pump chambers. Pump inlets 51c 53c communicate with the pump chambers 51a-53a respectively and inlet check valves 51d-53d are provided in the pump inlets and arranged to open for flow to the pump chambers and to close to prevent return flow. Pump outlets 51e-53e also communicate with the pump chambers 51a-53a respectively and have outlet check valves 51f-53f therein arranged to open for flow from the pump chambers and to close to prevent return flow. The valve chambers 51a-53a are conveniently formed at the interface between a pair of pump blocks 56 and 57 and, as best shown in FIGS. 7 and 8, rolling type diaphragms 59 are advantageously utilized to provide a seal between the reciprocating displacement members and the pump chamber. The displacement members 51b-53b have stems 51g-53g respectively that extend out through bores in the upper pump block 57 and the pump actuator 56 engages the outer ends of the stems to reciprocate the same. In the embodiment illustrated, the actuator 56 is in the form of a generally rectangular bar that overlies the outer ends of the stems 51g-53g and which is held against crosswise movement as by a pin 56a (FIGS. 3 and 4) that projects from one or more of the stems and which extends through an opening in the actuator bar. The cam 54 is conveniently in the form of a roller 54a mounted on an eccentric 54b secured to the motor shaft 55a. Guide plates 50a and 50b (FIG. 3) are mounted on the pump block and arranged to overlap opposite sides of the pump actuator bar 56 to guide the pump actuator bar and provide a safety shield for the pump actuator mechanism. An adjustable stroke limiting abutment 60 can advantageously be provided on the pump block to limit movement of one end of the actuator bar 60 to thereby control the stroke of the displacement member that is adjacent the abutment.

In accordance with the present invention, provision is made for supplying at least the gaseous ingredient and preferably all of the gaseous and liquid ingredients to the volumetric pump at a pressure substantially above atmospheric pressure but below the pressure to be maintained in the freezing chamber. Changes in the pressure on the gas supplied to the volumetric gas pump markedly change the proportions of the gas and liquid delivered by the pumping apparatus 12 to the pressurized freezing container. Regulation of the pressure of the gas supplied to the volumetric gas pump can be more accurately and economically achieved if the pressure is selected at substantially above atmospheric pressure, for example of the order of 5 to 10 p.s.i.g. Further, the supplying of gaseous and liquid ingredients to the pump apparatus 12 at above atmospheric pressure provides motive power for moving the displacement members of the volumetric pumps to their retracted positions and avoids the necessity of providing a separate retracting means such as the spring for retracting the displacement members and diaphragms 59.

The gas such as carbon dioxide is stored in the pressurized shipping container 14 under sufficient pressure to normally maintain it liquid, for example of the order of 600 to 1500 p.s.i.g. and higher, depending on ambient temperature and gas from the shipping container is delivered through a manually operable shut-off valve 71 and through a primary regulator 72 which reduces the gas pressure to an intermediate value, for example of the order of 15 p.s.i.g. Regulator 72 is preferably made adjustable as by an adjusting handle 72a to enable adjustment of the outlet pressure of the regulator and a gauge 72b is provided at the outlet to facilitate adjustment. Gas from regulator 72 is then passed through a line 73 and a secondary pressure regulator 74 and line 75 to the inlet of the volumetric gas pump 51. Secondary regulator 74 is preferably adjustable as by an adjusting handle 74a to adjust the pressure indicated by a gauge 74b to a pressure for example in the range of 5 to 15 p.s.i.g. which is substantially above atmospheric pressure but substantially below the pressure to be maintained in the freezing chamber 10.

Water for the beverage is preferably supplied directly from a pressurized supply line indicated at 13 through a water pressure regulator 78 and line 79 to the inlet of the volumetric water pump 52. Water pressure regulator 78 is also preferably adjustable as by an adjusting handle 78a and a gauge 78b provided at the outlet to facilitate adjustment. The water pressure regulator is adjusted to regulate the pressure on the liquid supply to the volumetric water pump to a value such as 5 to 15 p.s.i.g. which is substantially above atmospheric but substantially below the pressure to be maintained in the freezing chamber.

The flavoring syrup in the flavoring syrup reservoir 15 is preferably pressurized as though a line 81 connected to the outlet of regulator 72 and flavoring syrup is supplied through a delivery line 82 to the inlet of the volumetric syrup pump 53. In the embodiment illustrated, the syrup is supplied to the delivery line 82 under the gas pressure applied through primary gas regulator 72 to the flavoring syrup reservoir 15, and the gas pressure applied to the reservoir 15 is maintained substantially above atmospheric but substantially below the pressure to be maintained in the freezing chamber. Alternatively, a syrup pressure regulator could be provided in the syrup delivery line 82 to regulate the syrup pressure at the pump inlet independent of the primary gas pressure regulator 72.

The volumetric liquid and gaseous pumps 12 are operated to pump liquid and gaseous fluid ingredients to the pressure chamber to normally maintain the pressure in the chamber in a preselected super-atmospheric pressure range, for example in the range of 20 to 30 p.s.i.g. The drive motor 55 for the volumetric liquid and gaseous pumps 12 is energized under the control of a pressure switch 91 which operates to start the pump drive motor when the pressure falls below the selected pressure range and to stop the pump drive motor when the pressure rises above the preselected super-atmospheric pressure range. A normally closed manually operable switch 90 is preferably provided in the circuit to the pump motor 55 to enable the pump to be stopped when desired, for example during cleaning of the freezing cylinder. Although the pressure in the freezing chamber is maintained in a preselected super-atmospheric pressure range during normal operation, the pressure in the freezing chamber will be below the predetermined super-atmospheric pressure range during start-up and may also fall below the predetermined super-atmospheric pressure range if the rate of draw of semi-frozen products of the outlet 18 through valve 19 exceeds the rate at which the liquid and gaseous ingredients are supplied to the freezing chamber. In order to prevent unmetered flow of the liquid and gaseous products from the respective supplies to the freezing chambers, when the pressure in the freezing chamber is below the pump inlet pressures, a hold-back valve means 101 is provided to control flow from the pumps to the freezing chamber. In general, the hold-back valve means is arranged to inhibit flow from the several pumps until the pressure at the outlets of the pumps exceeds the highest of the pump inlet pressures. In the embodiment illustrated, the hold-back valve includes valve inlet ports 101a–101c which respectively communicate with the outlet passages 51e, 52e and 53e from the gas, water and flavoring syrup pumps 51–53, and a valve outlet port 101d that communicates with the freezing chamber. As best shown in FIG. 6, the valve inlet ports 101a–101c are conveniently formed in the pump block 56 and open at a valve face designated 101e, and a valve outlet port 101d is also formed in the block and opens at the face 101e. The hold-back valve member includes a diaphragm 101f adapted to engage the valve face 101e and block flow from the several inlet ports to the outlet ports. A valve member 101g overlies the side of the diaphragm opposite the valve seat and is yieldably urged to a position closing the valve port by a spring 101j. The spring pressure can be adjusted by a plug 101k threadedly mounted in the pump block 57. As shown in FIG. 7, the valve outlet port 101d is counterbored to receive a resilient valve seat 101m to assure reliable sealing of the outlet. Outlet 101d is connected through a delivery line 103 to the inlet 16e of the freezing chamber. As shown in FIG. 1, the pressure switch 91 is conveniently connected to the delivery line 103 at a location between the hold-back valve 101 and the freezing chamber to respond to the pressures in the freezing chamber. The hold-back valve is adjusted so that the pressure applied by spring 101j holds the valve in its closed position blocking flow to the outlet 101d, until the pressure at the underside of the valve member rises to a value which is at least slightly above, for example 2 or 3 p.s.i. above the highest value of the inlet pressure at the several volumetric pumps but below the pressure to be maintained in the freezing chamber. Thus, when the pressure in the freezing chamber is below the inlet pressure at pumps 51–53, as occurs during start-up of the apparatus or which may occur if the rate of draw substantially exceeds the rate of feed of liquid and gaseous ingredients to the freezing chamber, then the hold-back valve will remain closed until the pump increases the pressure in the several pump chambers to the value above the pressure setting of the hold-back valve, and the hold-back valve then opens to allow the pumps to deliver the liquid gaseous ingredients in proper proportions in the freezing chamber.

Servings of semi-frozen product are only intermittently withdrawn from the freezing chamber 10 through the dispensing valve 19 and usually not more than a few servings are drawn in quick succession. In order to provide a relatively fast product draw rate without requiring correspondingly large product pumps, it is advantageous to provide a product reservoir 83 in the product delivery line 103, which product reservoir has a capacity, for example three quarts, to store a quantity of liquid corresponding to at least several servings. As diagrammatically shown in FIG. 1, the product reservoir 83 is a closed tank or vessel and product delivery line 103 has an inlet section 103a and an outlet section 103b communicating with the reservoir. The inlet section 103a communicates with the top of the reservoir 83 and is preferably connected to a perforate spray pipe 83a inside the reservoir. The outlet section 103b is connected to an outlet pipe 83b that opens adjacent the bottom of the reservoir to normally pass mixed liquid and gaseous ingredients from the reservoir 83 to the freezing chamber 10.

The reservoir 83 is not refrigerated and some unmixed gas will separate from the liquid and gaseous product ingredients supplied to the reservoir and provide a gas head in the reservoir. A small gas bleed passage 83c is provided in the outlet pipe 83b at a location spaced above the bottom of the pipe, for example at about one third the height of the tank. The gas bleed-off passage 83c is sufficiently small, for example 0.040 inches in diameter, and such as to allow only a restricted flow of gas therethrough, when the liquid level L in the reservoir 83 drops below the bleed passage as product flows from the reservoir to the freezing chamber during draw off of semi-frozen product from the freezing chamber. The small quantity of gas that flows through bleed passage 83c mixes with the liquid flowing through pipe 83b and conduit 103b to the freezing chamber. This arrangement limits build-up of the gas head in the reservoir so that the normal liquid level L in the reservoir, when product is not being withdrawn, is adjacent or somewhat above the level of the bleed opening 83c. The spray pipe 83a delivers the liquid and gaseous products in relatively fine streams or droplets to enhance absorption of gas in the liquid as it flows into the reservoir.

In order to facilitate cleaning of the freezing chamber, provision is made for supplying the gas under pressure to the freezing chamber to force the product therein through the outlet. For this purpose, a valve 111 is connected through a line 112 to the carbon dioxide supply line 75 and is also connected through a line 113 to the fluid delivery line 103 leading to the freezing chamber. A check valve 114 is provided in the gas supply line 113 to prevent return flow when the pressure in the delivery line exceeds the gas pressure from line 75. Check valve 114 is conveniently located in the block 56, as best shown in FIGS. 6–8, comprises a passage 114a which is counterbored to receive a resilient valve seat 114b and a ball valve member 114c that is gravatationally urged to its closed position. A lateral passage 115 communicates the passage 114a with the hold-back valve outlet passage 101d. Solenoid 111a can be selectively operated under the control of a manually operable switch 110, which is operative when closed to energize solenoid 111a. This supplies gas under pressure to the freezing cylinder to enable discharge of product from the freezing cylinder without refilling the same. Switch 90 can be opened to disable the pump drive motor during cleaning of the freezing chamber.

From the foregoing it is thought that the construction and operation of the apparatus for preparing and dispensing a semi-frozen food product containing liquid and gaseous ingredients will be readily understood. The gas, such as carbon dioxide, water and a flavoring syrup are supplied to the inlets of the volumetric-type gas, water and syrup pumps 51–53 at a pressure substantially above atmospheric, for example 5 to 15 p.s.i.g., and sufficient to feed the respective gaseous and liquid ingredients to the supply chambers and move the respective displacement members to their retracted position, but below the pressure to be maintained in the freezing chamber. During start-up of the apparatus, the freezing chamber is initially at atmospheric pressure and filled with air. When the pump is energized it operates the gas, water and syrup pumps 51–53 to deliver the respective gaseous and liquid ingredients to the freezing chamber in preselected volumetric proportions determined by the relative volumetric displacements of the displacement members during each cycle. The volume of gas delivered during each pump cycle, measured at atmospheric pressure, will be dependent on the displacement of the gas pump and the pressure on the gas at the inlet of the gas pump 51. The hold-back valve 101 operates to inhibit flow from the gas and liquid pump chambers until the pressure at the outlet of at least one of the pumps rises substantially above the highest of the inlet pressures on the several pumps and the hold-back valve will open and close during each cycle of the pump until the pressure in the freezing chamber rises above the opening pressure for the holdback valve. At that time, the hold-back valve remains open and the pumps continue to deliver the gaseous and liquid ingredients to the freezing chamber in preselected proportions until the pressure switch 91 senses a pressure at the upper limit of the super-atmospheric pressure range to be maintained in the freezing chamber, to de-energize the pumps. The mixer and scraper 21 is driven continuously by its drive motor 22 when manually operable switch 19 is closed and the mixer 21 agitates and mixes the gaseous and fluid ingredients in the freezing chamber. The refrigerating mechanism is operated under the control of the viscosity sensor 42 and switch 41 to refrigerate the freezing chamber sufficient to freeze a quantity of the mixed gaseous and fluid ingredients. When producing a slush-type carbonated beverage, the pressure in the freezing chamber is advantageously selected in relation to the proportions of gas and liquid ingredients supplied to the freezing chamber such that it is substantially above the pressure at which all of the carbon dioxide will go into solution in the liquid ingredients at the freezing temperature of the product in the freezing chamber. For example, in preparing slush-type carbonated beverages it is desirable to use 2 to 4 volumes of carbon dioxide gas per volume of liquid measured at atmospheric pressure, and super-atmospheric pressures of 20 to 30 p.s.i.g. in the freezing chamber have been found sufficient. In this manner, the freezing chamber remains filled with mixed gaseous and liquid ingredients and there is no separate gas head in the freezing chamber which would reduce the efficiency of the refrigerating apparatus and cause sputtering of the product during dispensing.

The relative proportions of gas and liquid ingredients supplied to the freezing chamber can be readily varied by adjusting the inlet pressure to the volumetric gas pump. By increasing the gas inlet pressure, the effective ratio of the gas to liquid which is measured at atmospheric pressure, is increased. For example, if the inlet pressure to the volumetric gas pump is 5 p.s.i.g., the volume of gas delivered by the gas pump during each cycle, measured at atmospheric pressure, will be about one and one-third times the volumetric displacement of the gas pump. The gas pump is designed to have a volumetric displacement per cycle which is greater than the combined displacements of the water and syrup pumps. For example, if the gas pump displacement is one and one-half times the combined displacement of the water and syrup pumps, at 5 p.s.i.g. inlet pressure, the pumps will deliver about two volumes of gas per volume of liquid, measured at atmospheric pressure. At 10 p.s.i.g. gas pump inlet pressure, the pumps will deliver about two and one-half volumes of gas per volume of liquid measured at atmospheric pressure, and at 15 p.s.i.g. gas pump inlet pressure, the ratio will be about 3 to 1 measured at atmospheric pressure. For higher ratios of gas to liquid, the relative displacement of the gas and liquid pumps can be varied. The hold-back valve means 101 is adjusted to open at a pressure which is above the highest range or pressures at the inlets of the several pumps, but below the pressure range to be maintained in the freezing chamber. For example, good results have been obtained with the hold-back valve set at 20 to 22 p.s.i.g. and with the freezing chamber pressure switch set for operation in a somewhat higher range of 26 to 28 p.s.i.g. The volume of syrup dispensed during each cycle can be selectively adjusted as by adjusting the stroke of the displacement member 53b. As shown in FIG. 7, the stem 53g of the displacement member is mounted in a guide 53h that is threaded in the block 57. The guide 53h limits the return stroke of the displacement member 53b and can be threadedly adjusted in the block 57 to increase or decrease the travel and hence the displacement of the displacement member 53b during each cycle.

The embodiments of the invention in which an exclusive property or privilege is claimed are defined as follows:

1. In an apparatus for preparing and dispensing a semi-frozen food product containing liquid and gaseous product ingredients comprising, an enclosed freezing chamber adapted to contain liquid and gaseous product ingredients under super-atmospheric pressure and having a dispensing outlet, means in the freezing chamber for stirring the liquid and gaseous product ingredients, and refrigerating means for refrigerating the freezing chamber sufficient to freeze a quantity of the mixed gaseous and liquid product ingredients in the freezing chamber, a volumetric gas pump means including a gas pump chamber having an inlet and an outlet and a displacement means operable when driven to pump gas at a preselected rate from the inlet to the outlet, volumetric liquid pump means including at least one liquid pump chamber having an inlet and an outlet and a displacement means operable when driven to pump liquid at a preselected rate from the inlet to the outlet, gas supply means for connecting the inlet of the gas pump chamber to a source of pressurized gas product ingredient, liquid product ingredient supply means for connecting the inlet of said one liquid pump chamber to a source of liquid product ingredient, delivery means for connecting the outlets of said gas and liquid pump chambers to said freezing chamber, motor operated drive means operative when driven to drive the displacement means in the gas and liquid pump means to pump gaseous product ingredient and liquid product ingredient in predetermined proportions to the freezing chamber in opposition to the pressure in said freezing chamber, control means for controlling operation of the motor operated drive means to start the same when the pressure in the freezing chamber is below a predetermined super-atmospheric pressure range and to stop the same when the pressure in the freezing chamber is above said predetermined super-atmospheric pressure range, the improvement comprising said gas supply means including means for regulating the pressure on the gaseous product ingredient supplied to the inlet of the gas pump chamber to a pressure above atmospheric pressure and below said predetermined super-atmospheric pressure range, said liquid supply means including means for maintaining the pressure on the liquid product ingredient supplied to the inlet of said one liquid pump chamber at a pressure below said predetermined super-atmospheric pressure range, and hold-back valve means in the delivery means for controlling flow from the outlet of gas pump chamber to the freezing chamber and operative to inhibit flow from gas pump chamber until the pressure at the outlet of the gas pump chamber exceeds a preselected minimum delivery pressure which is higher than the pressure at the inlet to the gas pump chamber and below said predetermined super-atmospheric pressure range.

2. An apparatus for preparing and dispensing a semi-frozen food product according to claim 1 wherein said volumetric liquid pump means includes a second liquid pump chamber having an inlet and an outlet and a displacement means operable when driven to pump liquid from said inlet to said outlet, flavoring liquid supply means connecting the inlet of said second liquid pump chamber to a source of flavoring liquid, said flavoring liquid supply means including means for maintaining the pressure on the flavoring liquid supplied to the inlet of the second liquid pump chamber at a pressure below said predetermined super-atmospheric pressure range, said hold-back valve means including means for controlling flow from said second liquid pump chamber to said freezing chamber.

3. An apparatus for preparing and dispensing a semi-frozen food product according to claim 2 wherein said flavoring liquid supply means includes a container adapted to contain a quantity of flavoring liquid under pressure and having a gas inlet and a liquid outlet, means connected to the gas inlet for applying gas pressure to the flavoring liquid in the container at a pressure substantially above atmospheric and below said preselected minimum delivery pressure.

4. An apparatus for preparing and dispensing a semi-frozen food product according to claim 1 wherein gaseous product ingredient is carbon dioxide gas and said predetermined super-atmospheric pressure range is above the pressure at which all the carbon dioxide gas supplied by the gas pump means to the freezing chamber will go into solution in the liquid product ingredients supplied by the liquid pump means to the freezing chamber at the freezing temperature of the mixed gaseous and liquid product ingredients in the chamber.

5. An apparatus for preparing and dispensing a semi-frozen food product according to claim 1 wherein said hold-back valve means includes a valve inlet for gas and a valve inlet for liquid and a valve outlet and a single valve member for controlling flow from both of the valve inlets to the valve outlet.

6. An apparatus for preparing and dispensing a semi-frozen food product according to claim 1 wherein said hold-back valve means includes a valve inlet for gas and a valve inlet for liquid and a valve outlet spaced from each other and a single valve member adapted to overlie both of said valve inlets and said valve outlets, and means yieldably urging the valve member to a position blocking flow between both of said gas inlets and said outlet.

7. An apparatus for preparing and dispensing a semi-frozen food product according to claim 6 including means for adjusting said last mentioned means to adjust the pressure at which the hold-back valve opens.

8. An apparatus for preparing and dispensing a semi-frozen food product according to claim 1 wherein said liquid product ingredient supply means includes pressure regulator means adapted for connection to a pressurized water supply and operative to regulate the pressure on the liquid supplied to the inlet of the liquid pump chamber to a pressure above atmospheric pressure and below said predetermined super-atmospheric pressure range.

9. An apparatus for preparing and dispensing a semi-frozen food product according to claim 1 wherein said inlets of each said gas pump chamber and said liquid pump chamber have inlet check valve means therein operative to open for flow to the respective pump chamber and to close to prevent return flow, said outlets of each said gas pump chamber and said liquid pump chamber have outlet check valve means therein operative to open for flow from the respective pump chamber and to close to prevent return flow.

10. An apparatus for preparing and dispensing semi-frozen food product according to claim 1 wherein said delivery means includes a closed product reservoir, a first conduit means communicating the outlets of said gas and liquid pump means with said reservoir, and a second conduit means communicating the lower portion of said reservoir with said freezing chamber.

11. An apparatus for preparing and dispensing semi-frozen food product according to claim 1 wherein said delivery means includes a closed product reservoir, a first conduit means communicating the outlets of said gas and liquid pump means with said reservoir, a second conduit means communicating the reservoir with the freezing chamber, said second conduit means including an outlet pipe in the reservoir having a first opening adjacent the bottom of the reservoir sufficiently large to allow relatively free passage of liquid therethrough and a gas bleed opening in the pipe above the first opening and sufficiently small to allow a restricted flow of gas therethrough.

12. An apparatus for preparing and dispensing a slush-type beverage containing water, a flavoring syrup and a food grade gas, comprising, an enclosed freezing chamber adapted to contain the beverage under super-atmospheric pressure and having a dispensing outlet, means in the freezing chamber for stirring the beverage ingredients, and refrigerating means for refrigerating the freezing chamber sufficient to freeze a quantity of beverage in the freezing chamber, first and second and third volumetric pump means each including a pump chamber having inlet means with an inlet check valve and outlet means with an outlet check valve and displacement means operable when driven to pump fluid at a predetermined rate from the inlet means to the outlet means, water supply means for connecting the inlet means of the first volumetric pump means to a source of pressurized water, flavoring syrup supply means for connecting the inlet means of the second volumetric pump means to a pressurized syrup supply, and gas supply means for connecting the inlet means of the third pump means to a pressurized gas supply, delivery means for connecting the outlet means of said first, second and third pump means to said freezing chamber, motor operated drive means operative to drive the displacement means in the first, second and third pump means to pump water, flavoring syrup and gas in predetermined proportions to the freezing chamber in opposition to the pressure in the freezing chamber, control means for controlling operation of the drive means to start the same when the pressure in the freezing chamber is below a predetermined super-atmospheric pressure range and to stop the same when the pressure in the freezing chamber is above said predetermined super-atmospheric pressure range, the improvement comprising said water supply means including means for regulating the pressure on the water supplied to the inlet means of said first volumetric pump means to an inlet pressure above atmospheric pressure but below said predetermined super-atmospheric pressure range, said flavoring syrup supply means including means for regulating the pressure on the flavoring syrup supplied to the inlet means of said second volumetric pump means to an inlet pressure above atmospheric pressure but below said predetermined super-atmospheric pressure range, and said gas supply means including means for regulating the pressure on the gas supplied to the inlet means of said third pump means to an inlet pressure above atmospheric pressure but below said predetermined super-atmospheric pressure range, and hold-back valve means in said delivery means for controlling flow from the outlets of said first, second and third pump means to the freezing chamber and operative to inhibit flow from the first, second and third pump means to the freezing chamber until the pressure at at least one of their outlet means exceeds a preselected minimum delivery pressure which is above the highest of the pressures at the inlets of the first, second and third pump means and below said predetermined super-atmospheric pressure range.

13. An apparatus for preparing and dispensing a slush-type beverage according to claim 12 wherein said first, second and third pump means each include a rolling type diaphragm for sealing its pump chamber from its displacement member.

14. An apparatus for preparing and dispensing a slush-type beverage according to claim 12 wherein said holdback valve means includes a valve member having a valve face and first, second and third valve inlets opening at said valve face and respectively communicating with the outlet means of the first, second and third pump means, said hold-back valve means also including a valve outlet communicating with said freezing chamber, a valve member and means yieldably biasing said valve member to a closed position against said valve seat to normally block flow from the several valve inlets to the valve outlet.

15. Apparatus for preparing and dispensing a slush-type beverage according to claim 12 wherein said means for regulating the pressure on the gas supplied to the inlet means of the third pump means is adjustable to adjust the proportion of the gas to water and syrup at atmospheric pressure.

16. An apparatus for preparing and dispensing a slush-type beverage according to claim 15 wherein the stroke of the displacement means in the second pump means is adjustable to vary the amount of syrup dispensed during each pump cycle.

17. An apparatus for preparing and dispensing a slush-type beverage according to claim 12 wherein said delivery means includes a closed product reservoir, a first conduit means communicating the outlets of said first, second and third pump means with said revervoir, and a second conduit means communicating the lower portion of said reservoir with said freezing chamber.

18. An apparatus for preparing and dispensing a slush-type beverage according to claim 12 wherein said delivery means includes a closed product reservoir, a first conduit means communicating the outlets of said first, second and third pump means with said reservoir, a second conduit means communicating the reservoir with the freezing chamber, said second conduit means including an outlet pipe in the reservoir having a first opening adjacent the bottom of the reservoir sufficiently large to allow relatively free passage of liquid therethrough and a gas bleed opening in the pipe above the first opening and sufficiently small to allow a restricted flow of gas therethrough.

19. In an apparatus for preparing and dispensing a frozen food product containing liquid and gaseous product ingredients, the apparatus including an enclosed freezing chamber having a valved dispensing outlet, volumetric gas pump means and volumetric liquid pump means for respectively delivering gas and liquid product ingredients to the freezing chamber, pump drive means for driving the gas and liquid pump means to deliver gas and liquid product ingredients to the freezing chamber, and control means for controlling operation of the pump drive means to start the pump drive means when the pressure in the freezing chamber is below a predetermined super-atmospheric pressure range and to stop the same when the pressure in the freezing chamber is above said predetermined super-atmospheric pressure range, the improvement comprising means for supplying the gaseous product ingredients to the volumetric gas pump means at a preselected gas supply pressure above atmospheric pressure but below said predetermined super-atmospheric pressure range, means for supplying liquid product ingredients to the volumetric liquid pump means at a liquid supply pressure below said predetermined super-atmospheric pressure range, and hold-back means for inhibiting flow of gas and liquid product ingredients from at least the gas pump means to the freezing chamber until the pressure on the gas delivered by the volumetric gas pump means exceeds a predetermined minimum delivery pressure which is above said preselected gas supply pressure to the volumetric gas pump means but below said predetermined super-atmospheric pressure range.

20. An apparatus for preparing and dispensing a frozen food product according to claim 19 including gas bypass means for by-passing said gas pump means and said hold-back means and operable to supply gaseous product ingredients under above atmospheric pressure to said freezing chamber to pressurize the product therein and enable discharge of the contents of the freezing chamber through the valved dispensing outlet for cleaning.

21. A method of operating an apparatus for preparing and dispensing a semi-frozen food product containing liquid and gaseous product ingredients, the apparatus including an enclosed freezing chamber having a dispensing outlet, volumetric gas pump means and volumetric liquid pump means for respectively delivering gas and liquid product ingredients to the freezing chamber, pump drive means for driving the gas and liquid pump means to deliver gas and liquid product ingredients in predetermined proportions to the freezing chamber and control means responsive to the pressure in the freezing chamber to start the pump drive means when the pressure in the freezing chamber is below a predetermined super-atmospheric pressure range and to stop the same when the pressure is above said predetermined superatmospheric pressure range, the steps of supplying gaseous product ingredients to the volumetric gas pump means at a preselected gas supply pressure above atmospheric pressure but below said predetermined super-atmospheric pressure range, supplying liquid product ingredient to the volumetric liquid pump means at a liquid supply pressure below said predetermined super atmospheric pressure range, and inhibiting flow of gas product ingredient from the gas pump means to the freezing chamber until the pressure on the gas delivered by the volumetric gas pump means exceeds a predetermined minimum delivery pressure which is above the gas supply pressure to the volumetric gas pump means but below said predetermined super-atmospheric pressure range.

22. A method of operating an apparatus for preparing and dispensing a frozen food product containing liquid and gaseous product ingredients according to claim 21 wherein said liquid product ingredient is supplied to the volumetric liquid pump means at a pressure above atmospheric pressure.

23. A method of operating an apparatus for preparing and dispensing a frozen food product containing liquid and gaseous ingredients according to claim 22 wherein the gas supply pressure is at least five pounds above atmospheric pressure.

24. A method of operating an apparatus for preparing and dispensing a frozen food product containing liquid and gaseous product ingredients according to claim 21 wherein the gaseous product ingredient is carbon dioxide gas and the predetermined super-atmospheric pressure range is above the pressure at which all of the carbon dioxide gas supplied by the gas pump means to the freezing chamber will go into solution in the liquid product ingredients supplied by the liquid pump means to the freezing chamber at the freezing temperature of the mixed gaseous and liquid product ingredients in the chamber.

25. A method of operating an apparatus for preparing and dispensing a frozen food product containing liquid and gaseous product ingredients according to claim 24 wherein the gas and liquid supply pressure are at least five pounds above atmospheric pressure.

* * * * *